United States Patent [19]

Fukuoka

[11] 4,054,914
[45] Oct. 18, 1977

[54] FACSIMILE SCANNING CONVERSION SYSTEM

[75] Inventor: Kenji Fukuoka, Fussa, Japan

[73] Assignee: Olympus Optical Company Limited, Tokyo, Japan

[21] Appl. No.: 735,770

[22] Filed: Oct. 26, 1976

[30] Foreign Application Priority Data

Oct. 29, 1975 Japan ............................ 50-130038
Oct. 29, 1975 Japan ............................ 50-130039

[51] Int. Cl.² ............................................ H04N 1/40
[52] U.S. Cl. .............................. 358/256; 358/140; 358/287
[58] Field of Search ............ 358/260, 264, 280, 287, 358/137, 140, 256, 77

[56] References Cited

U.S. PATENT DOCUMENTS

| 3,272,918 | 9/1966 | Koll | 358/287 |
|---|---|---|---|
| 3,541,245 | 11/1970 | Wilby | 358/287 |
| 3,603,727 | 9/1971 | Kinugawa | 358/287 |
| 3,830,971 | 8/1974 | van de Polder | 358/140 |

Primary Examiner—Howard W. Britton

[57] ABSTRACT

A facsimile scanning conversion system which can convert a facsimile scanning at a transmitter side or a receiver side such that a picture surface received at the receiver is correctly similar to that to be transmitted from the transmitter when either one or both an index of cooperation and a scanning speed of a facsimile transmitter is or are different from that or those of a facsimile receiver is disclosed. The facsimile scanning conversion system makes use of a facsimile scanner, a buffer memory, an electrical transmission control device, an addition register and a scanning control device. The electrical transmission control device causes the buffer memory to read out one scanning line picture signal therefrom or to write in the one scanning line picture signal thereto with a given period which coincides with a scanning period of corresponding receiver or transmitter for effecting a continuous scanning and adds a ratio of indexes of cooperation between the transmitter and the receiver to the addition register with the above mentioned period. The scanning control device causes the facsimile scanner to effect one line scanning and also causes the buffer memory to write in one scanning picture signal thereto and to read out the one scanning picture signal therefrom when a value of an integer portion of the addition register is not zero and at the same time causes the addition register to subtract 1 from the value of the integer portion thereof.

2 Claims, 6 Drawing Figures

FACSIMILE SCANNING CONVERSION SYSTEM

This invention relates to a facsimile scanning conversion system which can convert a facsimile scanning at a transmitter side or a receiver side such that a received picture surface is correctly similar to a picture surface to be transmitted when either or both an index of cooperation and a scanning speed of a facsimile transmitter is or are different from that or those of a facsimile receiver.

In the case of facsimile transmission and reception, in order to obtain a received picture surface which is correctly similar to a transmitted picture surface, the index of cooperation and the scanning speed of both the transmitter and the receiver must be made equal with each other.

Let an index of cooperation be M, it is given by $$M = D \cdot F \qquad (1)$$

where $D$ is a diameter of a corresponding circle which is a diameter of a drum of a drum type facsimile, a diameter of a cylindrically arranged portion of fibers of a LC conversion fiber facsimile and a diameter of a cylindrically arranged portion of conductors of a multistylus type plane scanning facsimile, and F is a scanning line density. The above mentioned diameter D is given by $$D = \frac{L}{\pi} \qquad (2)$$

where $L$ is a picture surface width or scanning line length and $\pi$ is a ratio of the circumference to its diameter.

In addition, in order to effect the transmission and reception in a real time without accumulating picture surface informations, each scanning at the transmitter and the receiver must be effected in synchronism with each other. That is, the number of scanning rotations at the transmitter and the receiver or the number of scannings per unit time in general must be equal with each other.

In short, conditions required for sufficiently effecting the transmission and the reception in the real time without changing as aspect ratio of the picture surface are defined by the following two equations, i.e., $$Mt = Dt \cdot Ft = Dr \cdot Fr = Mr \qquad (3)$$

and $$Nt = Nr \qquad (4)$$

where $Mt$, $Dt$, $Ft$ and $Nt$ are $M$, $D$, $F$ and $N$ at the transmitter side and $Mr$, $Dr$, $Fr$ and $Nr$ are $M$, $D$, $F$ and $N$ at the receiver side.

Let T be a time required for electrically transmitting one copy of the picture surface and let U be a longitudinal length of the picture surface, T is given by $$T = F \cdot U/N \qquad (5)$$

As described above, in the case of effecting the facsimile transmission and reception, one cannot use all kinds of transmitters and receivers. If the number of rotations becomes different or if the scanning line density becomes different even when use is made of the same $A_4$ size copy, the electrical transmission could not correctly be recorded.

In order to effect the correct recording even when the number of rotations becomes different or the index of cooperation of the transmitter and the receiver are different from each other, certain scanning conversion must be effected at either of or both the transmitter side and the receiver side such that the number of rotations and the index of cooperation of the transmitter and the receiver coincide with each other.

Attempts have been made to use as the above mentioned scanning conversion system a buffer memory for one picture surface which can memorize a facsimile signal for one picture surface to be transmitted or received and control an operation for reading out the facsimile signal thus memorized, thereby effecting equivalent scanning conversion at both the transmitter and the receiver sides. The use of the buffer memory for one picture surface provides the disadvantage that a picture element density for an $A_4$ size copy having four picture elements per mm becomes about 1 M bits and hence a semiconductor memory and a core memory are not economical in use and a magnetic disc memory and a magnetic tape memory become large in size and provision must be made of special measures for the purpose of effecting an online electrical transmission that is effected at the same time as the accumulation of the picture surface informations.

Attempts have also been made to make main scanning and auxiliary scanning at the transmitter and receiver sides changeable in operation. Such scanning conversion system, however, has the disadvantage that the use of a mechanical scanning system only could not be applied in practice and hence provision must be made of an electronic tube scanning system or a solid-state scanning system for the main scanning, and as a result, such scanning conversion system could not be applied to a completely mechanical scanning type facsimile apparatus and also expensive.

An object of the invention is to provide a facsimile scanning conversion system which can obviate the above mentioned disadvantages of the conventional facsimile scanning conversion systems.

A principle of the facsimile scanning conversion system according to the invention will now be described.

In order to bring the number of scannings per unit time N at the transmitter side into agreement with that at the receiver side, one scanning time of the main scanning at the transmitter side is required to be equal to that at the receiver side. For this purpose, in accordance with the invention, use is made of a buffer memory for at least one scanning line at the transmitter side or at the receiver side. If provision is made of such buffer memory at the transmitter side, a picture signal for one scanning line obtained by scanning is accumulated in the buffer memory and a reading out speed of the picture signal thus accumulated is changed in dependence with a scanning time at the receiver side. That is, let number of picture elements per one scanning at the receiver side be $n$ bits, then in order to scan or read out such one scanning line in T seconds, a reading out clock frequency fck must be selected as given by $$fck = (n/T) \qquad (6)$$

In the similar manner, if provision is made of the buffer memory at the receiver side, a picture signal for one scanning line electrically transmitted from the transmitter side is memorized in the buffer memory and the one scanning line thus memorized may be read out with the clock frequency fck.

As described above, the conversion of the main scanning is effected by bringing the number of scanning per unit time N at the transmitter side into agreement with that at the receiver side and vice versa.

In order to bring the index of cooperation M at the transmitter side into agreement with that at the receiver side and vice versa, one scanning time of the auxiliary scanning at the transmitter side may be brought into agreement with that at the receiver side and vice versa.

As can be seen from the equation (1), the index of cooperation M represents number of scanning line included in the length of the diameter of the corresponding circle D. By taking the fact that the facsimile transmission and the facsimile reception must be effected without changing the aspect ratio of the picture surface into consideration, the fact that the index of cooperation at the transmitter side is equal to that at the receiver side means that the total number of scanning lines at the transmitter side is equal to that at the receiver side. That is, the fact that the index of cooperation at the transmitter side is equal to that at the receiver side means that number of auxiliary scanning transmission in 1/F mm at the transmitter side is equal to that at the receiver side. In other words, if the index of cooperation M at the transmitter side is different from that at the receiver side, the auxiliary scanning must be effected such that the number of the auxiliary scanning transmission, that is, the total number of scanning lines per one picture surface at the transmitter side is brought into agreement with that at the receiver side. Such conversion will hereinafter be abbreviated as auxiliary scanning conversion.

In the case of bringing the number of scanning lines at the transmitter side into agreement with that at the receiver side, it is necessary to skip that number of scanning lines which exceeds the required number of scanning lines to be electrically transmitted and to interpolate that number of scanning lines which is short of the required number of scanning lines to be electrically transmitted. In the case of effecting interpolation between two adjacent scanning lines, it is troublesome to provide an average picture signal which is intermediate between the two adjacent scanning lines. In place of such measure, it is possible to repeatedly use a picture signal whose scanning line is the same as the adjacent scanning line.

The invention will now be described in greater detail with reference to the accompanying drawings, wherein:

FIG. 1 diagrammatically illustrates picture surfaces at transmitter and receiver sides when an index of cooperation M at the transmitter side is different from that at the receiver side;

Figure 1:
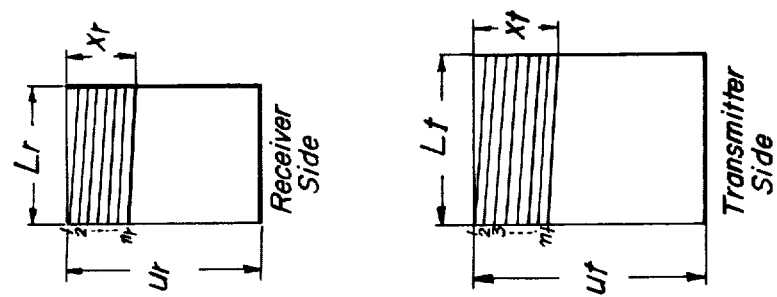

In FIG. 1 is shown picture surfaces at transmitter and receiver sides when an index of cooperation M at the transmitter side is different from that at a receiver side. When the $nt$ th scanning line at the transmitter side is scanned, the $nr$ th scanning line at the receiver side is scanned and recorded. In this case, the auxiliary scanning is effected up to a length $xt$ from the leading end of a record copy at the transmitter side and up to a length $xr$ from the leading end of the record copy at the receiver side. In order to eliminate strain from a received picture, amounts of auxiliary scanning $xt$, $xr$ at the transmitter and receiver sides must be proportional to lengths of the scanning lines $Lt$, $Lr$ at the transmitter and receiver sides, respectively. That is, $$\frac{nt}{Ft \cdot Lt} = \frac{nr}{Fr \cdot Lt} \tag{7}$$

Let longitudinal lengths of the effective picture surfaces at the transmitter and receiver sides be $Ut$, $Ur$, then $$\frac{Lt}{Ut} = \frac{Lr}{Ur} \tag{8}$$

Thus, the equation (7) is rewritten into $$\frac{nt}{Ft \cdot Ut} = \frac{nr}{Fr \cdot Ur} \tag{9}$$

In the above equation (9), the denominators of the left and right sides represent the total number of the scanning lines at the transmitter and receiver sides.

From the equations (2) and (3), the equation (7) is rewritten into $$\frac{nt}{Mt} = \frac{nr}{Mr} \tag{10}$$

As a result, when the scanning is converted at the transmitter side, the $nt$ th scanning line on a manuscript to be electrically transmitted is determined by the $nr$ th scanning line to be received and recorded, that is, by the following equation $$nt = \left[ \frac{Mt}{Mr} nr \right] \tag{11}$$

where brackets [ ] is a gauss symbol which represents the maximum integer which is at most that number which is included in the brackets.

An example of scanning conversion in the case of $Mt/Mr = 0.6$ is shown in the following Table I.

Table I

| Mt/Mr = 0.6 | Nr | 1 | 2 | 3 | 4 | 5 | 6 | 7 | 8 | 9 | 10 | 11 |
|---|---|---|---|---|---|---|---|---|---|---|---|---|
| | nt | 0 | 1 | 1 | 2 | 3 | 3 | 4 | 4 | 5 | 6 | 6 |

An example of scanning conversion in the case of $Mt/Mr = 1.3$ is shown in the following Table II.

Table II

| $Mt/Mr = 1.3$ | nr | 1 | 2 | 3 | 4 | 5 | 6 | 7 | 8 | 9 | 10 | 11 |
|---|---|---|---|---|---|---|---|---|---|---|---|---|
| | nt | 1 | 2 | 3 | 5 | 6 | 7 | 9 | 10 | 11 | 13 | 14 |

In the above Table I, the same numerical value listed in succession means that the same scanning line represented by these successive numerical value is electrically transmitted in repeated manner.

In the above Table II, absence of the value of nt, for example, 4 next to 3 and presence of 5 means that the picture signal of the 4th scanning line is not electrically transmitted.

When the scanning is converted at the receiver side, the nr th scanning line to be recorded on a record sheet disposed at the receiver side is determined by the nt th received scanning line of the electrically transmitted signal, that is, by the following equation $$nr = \left[ \frac{Mr}{Mt} nt \right] \qquad (12)$$

An example of scanning conversion in the case of $Mr/Mt = 0.6$ is shown in the following Table III.

Table III

| $Mt/Mr = 0.6$ | nt | 1 | 2 | 3 | 4 | 5 | 6 | 7 | 8 | 9 | 10 | 11 |
|---|---|---|---|---|---|---|---|---|---|---|---|---|
| | nr | 0 | 1 | 1 | 2 | 3 | 3 | 4 | 4 | 5 | 6 | 6 |

The scanning conversion shown in the above Table III is obtained by replacing nr, nt shown in the Table I by nt, nr.

An example of scanning conversion in the case of $Mr/Mt = 1.3$ is shown in the following Table IV.

Table IV

| $Mr/Mt = 1.3$ | nt | 1 | 2 | 3 | 4 | 5 | 6 | 7 | 8 | 9 | 10 | 11 |
|---|---|---|---|---|---|---|---|---|---|---|---|---|
| | nr | 1 | 2 | 3 | 5 | 6 | 7 | 9 | 10 | 11 | 13 | 14 |

The scanning conversion shown in the above Table IV is obtained by replacing nr, nt shown in the Table II by nt, nr.

In the above Table III, the same numerical value listed in succession means that the scanning is stopped at the same scanning line, that is, the signal of the scanning line of, for example, $nt = 3.6$, etc. is not regarded and hence not recorded.

In the above Table IV, absence of the value of nr, for example, 4 next to 3 and presence of 5 means that one scanning line becomes skipped. In practice, however, if one scanning line becomes skipped, there is produced a gap, so that the picture signal of the next scanning line should be recorded. For example, the picture signal of the scanning line signal of $nt = 4.7$, etc. should repeatedly be recorded twice times.

In short, the picture signal is electrically transmitted at a given speed to the transmitter side or to the receiver side connected to the transmission line and at the scanning device side the intermittent auxiliary scanning determined by the equation (11) or (12) are effected. Thus, it is necessary to use a buffer memory between successive intermittent auxiliary scannings.

In other words, at both the transmitter and receiver sides, if the same numerical value is produced in succession, the auxiliary scanning becomes stopped and if the numerical value becomes increased, the auxiliary scanning can intermittently be effected in synchronism with the main scanning by the increased amount of the numerical value.

Figure 2:
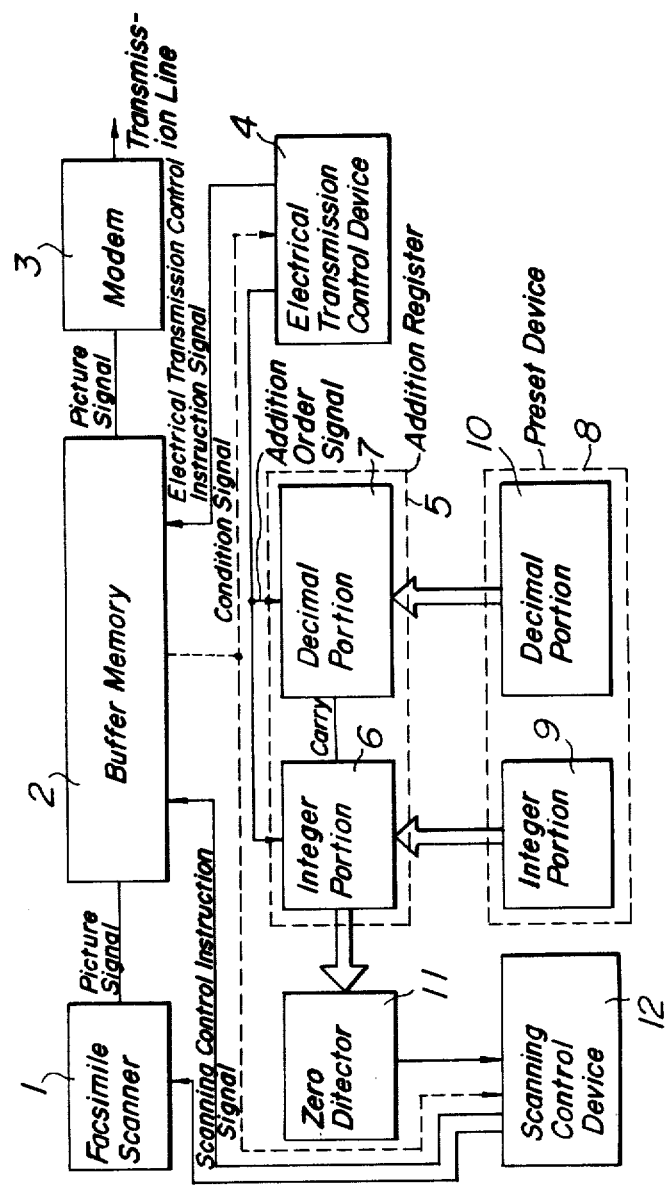
FIG. 2 is a block diagram illustrating one embodiment of the facsimile scanning conversion system according to the invention which makes use of a relatively complex calculation process.

In FIG. 2 is shown one embodiment of the facsimile scanning conversion system according to the invention constructed on the basis of the above mentioned principle. In FIG. 2 reference numeral 1 designates a facsimile scanner, 2 a memory such as a buffer memory for one scanning line and 3 a modem. These facsimile scanner 1, memory 2 and modem 3 constitute a facsimile transmitter or a facsimile receiver. In the case of the facsimile transmitter, a picture signal delivered from the scanner 1 is transferred through the buffer memory 2 and the modem 3 to a transmission line.

In the case of the facsimile receiver, a picture signal electrically transmitted from the transmission line is delivered through the modem 3 and buffer memory 2 to the scanner 1 which can reproduce the picture signal thus received.

Reference numeral 4 designates an electrical transmission control device. In the case of the facsimile transmitter, the electrical transmission control device 4 delivers to the buffer mrmory 2 an electrical transmission control instruction signal which can read out the picture signal memorized in the buffer memory 2 in a period which coincides with the scanning period of the other receiver for effecting the continuous scanning. In the case of the facsimile receiver, the electrical transmission control device 4 delivers to the buffer memory 2 an electrical transmission control instruction signal which can write in the picture signal electrically transmitted from the other transmitter to the buffer memory 2 with a period which coincides with the scanning period of the other transmitter for effecting the continuous scanning. The electrical transmission control device 4 also generates an addition order signal with the above mentioned period.

Reference numeral 5 designates an addition register composed of an integer portion 6 and a decimal portion 7 and 8 a preset device composed of an integer portion 9 and a decimal portion 10. The addition register 5 becomes operative in response to the addition order signal delivered from the electrical transmission control device 4 so as to add in succession the ratio of the indexes of cooperation between the transmitter and the receiver $Mt/Mr$ or $Mr/Mt$ preset in the preset device 8.

Reference numeral 11 designates a zero detector for detecting whether a content of the integer portion 6 of the addition register 5 is zero or not and generating an output when the content is not zero, 12 a scanning control device which becomes operative in response to the output from the zero detector 11 and generates a scanning control instruction signal for instructing the scanning operation of the facsimile scanner 1 and for instructing the writing in operation (in the case of the transmitter) and the reading out operation (in the case of the receiver). The scanning control device 12 becomes also operative in response to the output from the zero detector 11 and generates a subtraction instruction signal $(-1)$.

The operation of the facsimile scanning conversion system shown in FIG. 2 in the case of the transmitter will now be described.

At first, the content of the addition register 5 is assumed to be zero. In this case, the buffer memory 2 is cleared to read out one scanning line picture signal which is white as a whole by means of the electrical transmission control instruction signal from the electrical transmission control device 4. As soon as this electrical transmission is terminated, the addition register 5 is operated by the addition order signal from the electrical transmission control device 4 and the preset device 8 becomes operated to add the ratio of the indexes of cooperation between the transmitter and the receiver $Mt/Mr$ from the preset device 8 to the addition register 5.

Let $Mt/Mr=1.3$ be added to the addition register 5, the integer portion 6 of the addition register 5 becomes 1 and the zero detector 11 detects that the content of the integer portion 6 is not zero to generate an output which is delivered to the scanning control device 12. The scanning control device 12 becomes operative in response to the output from the zero detector 11 to generate a scanning control instruction signal. The scanning control instruction signal causes the facsimile scanner 1 to effect a first scanning and a first scanning picture signal is written in the buffer memory 2. The scanning control device 12 also generates a subtraction order signal ($-1$) to subtract from the integer portion 6 of the addition register 5. As a result, the integer portion 6 becomes zero. So, the scanning operation of the facsimile scanner 1 and the writing in operation of the buffer mrmory 2 are ceased until the content of the integer portion 6 becomes not zero again.

After a little time from the termination of the electrical transmission of the one scanning line picture signal or from the termination of the writing in operation to the buffer memory 2, the electrical transmission control device 4 generates an electrical transmission control instruction signal which causes the buffer memory 2 to electrically transmit the first scanning picture signal. After the termination of this electrical transmission, the electrical transmission control device 4 generates an addition order signal, so that a preset value of 1.3 is added to the addition register 5. As a result, the integer portion 6 of the addition register 5 becomes 1 and not zero. Thus, the scanning control device 12 becomes operated in the same manner as described above to effect a second scanning operation of the facsimile scanner 1 and a writing in operation to the buffer memory 2. At the same time, 1 is subtracted from the integer portion 6 of the addition register 5, so that the integer portion 6 becomes zero. Then, the electrical transmission control device 4 is operated to electrically transmit the second scanning picture signal from the buffer memory 2. After this electrical transmission, 1.3 is added to the addition register 5 whose value becomes 1.9. Since the integer portion 6 of the addition register 5 is 1, the same operation as described above is effected. That is, a third scanning picture signal is written in and electrically transmitted and the value of the addition register 5 becomes 2.2. As a result, the integer portion 6 of the addition register 5 is 2 and not zero, so that in the same manner as described above a fourth scanning operation of the facsimile scanner 1 and a writing in operation of the fourth scanning picture signal to the buffer memory 2 are effected and at the same time 1 is subtracted from the integer portion 6 of the addition register 5. As a result, the integer portion 6 of the addition register 5 is 1 and not zero, so that a succeeding fifth scanning operation and writing in operation of the fifth scanning picture signal to the buffer memory 2 are effected. In this case, the fifth scanning picture signal is superimposed on the fourth scanning picture signal previously memorized in the buffer memory 2 and the previous fourth scanning picture signal becomes lost.

In the case of the receiver, the picture signal is transmitted in opposite direction and two scanning lines are read out in succession from the buffer memory 2 and recorded by the facsimile scanner 1. This means that the same memorized picture signal of the two scanning lines is repeatedly recorded.

Now, returning again to the operation of the transmitter. At the same time as the fifth scanning operation of the facsimile scanner 1 and the writing in operation to the buffer memory 2, 1 is subtracted from the integer portion 6 of the addition register 5 and hence the integer portion 6 becomes zero. As a result, in the same manner as described above, the electrical transmission control device 4 causes the fubber memory 2 to electrically transmit the fifth scanning picture signal. In the same manner, it is possible to electrically transmit the scanning picture signals exclusive of the fourth and eighth scanning picture signals in the manner as shown in the Table II.

The operation of the facsimile scanning conversion system shown in FIG. 2 will now be described in the case of $Mt/Mr=0.6$.

In this case, when the electrical transmission of one scanning line picture signal which is white as a whole is terminated, the addition register 5 is operated by the addition order signal from the electrical transmission control device 4 to set the decimal portion 7 of the addition register 5 to 0.6. In this case, the integer portion 6 of the addition register 5 is zero, so that the scanning operation of the facsimile scanner 1 and the writing in operation to the buffer memory 2 are not effected. The electrical transmission control device 4 causes the buffer memory 2 to electrically transmit the 0th scanning line picture signal all of which is white. After the termination of this electrical transmission, the electrical transmission control device 4 causes the addition register 5 to be added with 0.6. As a result, the integer portion 6 of the addition register 5 becomes 1 and not zero. Thus, the scanning control device 12 causes a first scanning operation of the facsimile scanner 1 and a writing in operation to the buffer memory 2. At the same time, 1 is subtracted from the integer portion 6 of the addition register 5, so that the integer portion 6 becomes zero. Then, the electrical transmission control device 4 causes the buffer memory 2 to electrically transmit the first running picture signal. After this electrical transmission, 0.6 is added to the addition register 5 whose content becomes 0.8. Since the integer portion 6 of the addition register 5 is zero, the scanning operation of the facsimile scanner 1 and the writing in operation to the buffer memory 2 are not effected. Then, the first scanning picture signal is electrically transmitted from the buffer memory 2.

In the case of the receiver, the picture signal is transmitted in opposite direction and the scanning picture signal received through the modem 3 is always memorized by the buffer memory 2. The previously memorized scanning picture signal is written in the succeeding scanning picture signal which is then read out by the buffer memory 2 and recorded by the facsimile scanner 1. The addition order signal operates in the same manner as in the case of the transmitter.

Now, returning again to the operation of the transmitter. As soon as the electrical transmission of the first scanning picture signal, 0.6 is added to the addition register 5 whose content becomes 1.4. The integer portion 6 of the addition register 5 becomes 1 and not zero. Thus, a second scanning operation of the facsimile scanner 1 and a writing in operation to the buffer memory 2 are effected. At the same time, 1 is subtracted from the integer portion 6 of the addition register 5, so that the integer portion 6 becomes zero. In the same manner, it is possible to electrically transmit the scanning picture signals in interpolation manner as shown in the Table I.

The writing in operation to the buffer memory 2 effected by the scanning control instruction signal delivered from the scanning control device 12 must not be interfered with the reading out operation from the buffer memory 2 effected by the electrical transmission control signal delivered from the electrical transmission control device 4. That is, during the reading out operation of the memorized information of the one scanning line picture signal, such memorized information should not be broken by the writing in operation. In addition, the memorized information of the one scanning line picture whose writing in operation is not yet terminated should not be read out.

In the above mentioned embodiment shown in FIG. 2, the capacity of the buffer memory 2 is prepared only for one scanning line picture signal, so that the reading out operation from the buffer memory 2 is always continuously effected to electrically transmit the one scanning line picture signal. As a result, the writing in operation from the facsimile scanner 1 to the buffer memory 2 must be effected in a short time or blanking time lasted from the end of the reading out operation of the previous scanning line picture signal to the beginning of the reading out operation of the succeeding scanning line picture signal.

In the receiver in which the capacity of the buffer memory 2 is prepared only one scanning line picture signal, the reading out operation from the buffer memory 2 and the recording operation of the facsimile scanner 1 must be effected in a short time or blanking time since the picture signal is always continuously received and the writing in or memorizing operation to the buffer memory 2 must be effected without interruption except the short blanking time between the scanning lines.

In order to avoid such interference, in the embodiment of the facsimile scanning conversion system shown in FIG. 2, a condition signal is supplied from the buffer memory 2 to both the electrical transmission control device 4 and the scanning control device 12 so as to cause these devices 4, 12 to operate in times separated from each other.

Figure 3:
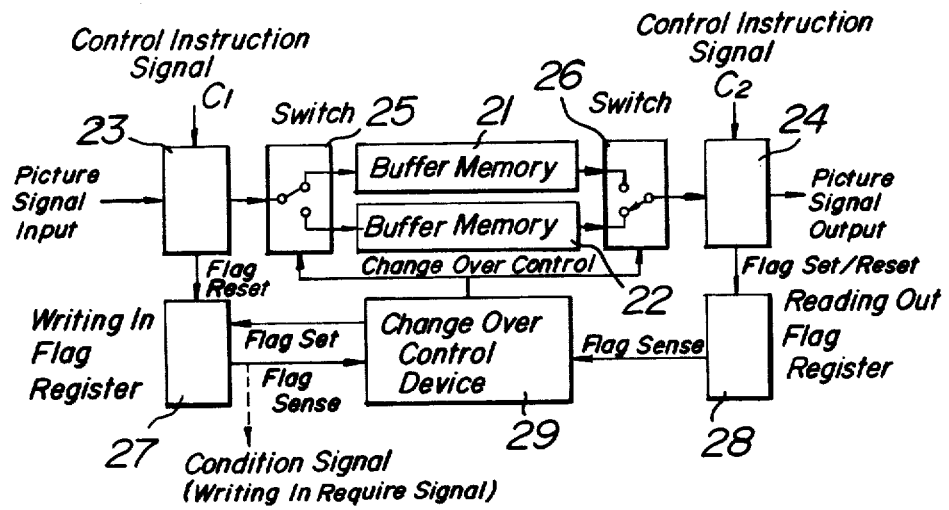
FIG. 3 is a block diagram illustrating a modified embodiment of the facsimile scanning conversion system according to the invention shown in FIG. 2.

In FIG. 3 is shown another embodiment of the facsimile scanning conversion system according to the invention which makes use of two buffer memories for the purpose of making the operation speed of the facsimile scanner slow. In FIG. 3, a control instruction signal $C_1$ corresponds to the scanning (writing in) control instruction signal to be supplied to the facsimile scanner 1 shown in FIG. 3 in the case of the transmitter and corresponds to the electrical transmission (reading out) control instruction signal to be supplied to the buffer memory 2 shown in FIG. 2 in the case of the receiver.

A control instruction signal $C_2$ corresponds to another control instruction signal to be supplied from the outside for the purpose of effecting the writing in and reading out operations. Each buffer memories 21, 22 has a capacity which can memorize one scanning line picture signal information. One of inputs of these buffer memories 21, 22 is connected through a switch 25 to a writing in device 23, while one of outputs of these buffer memories 21, 22 is connected through a switch 26 to a reading out device 24. A writing in flag register 27 is reset when the writing in operation to the buffer memories 21, 22 is terminated. A reading out flag register 28 is set by the reading out device 24 during the reading out operation from the buffer memories 21, 22 and is reset after the end of the reading out operation from the buffer memories 21, 22. A change-over control device 29 is sensitive to reset state of both the writing in flag register 27 and the reading out flag register 28 so as to change over the switches 25, 26, thereby changing over the input and the output of the buffer memories 21, 22 and connecting that buffer memory which has effected its writing in operation to the reading out side and connecting that buffer memory which has effected its reading out operation to the writing in side. After such change over, the change over control device 29 serves to set the writing in flag register 27 whose output is supplied as a condition signal or as a writing in require signal to a control device for delivery the control instruction signal $C_1$ (not shown). The writing in flag register 27 is not reset until the control instruction signal $C_1$ is delivered from the above mentioned device (not shown). As a result, if a plurality of control instruction signals $C_2$ are supplied to the reading out device 24 while the writing in flag register 27 is not reset, the reading out device 24 can read out the same content from the same buffer memory over a plurality of times. That is, the content of the buffer memory is required to be not broken by the reading out operation therefrom. Conversely, if a plurality of control instruction signals $C_1$ are supplied to the writing in device 23 when the reading out operation is not effected and the reading out flag register 28 is reset, the buffer memories 21, 22 are changed over every time one scanning line writing in operation is terminated and hence the writing in operation is alternately effected for every scanning line. As a result, that picture signal information which precedes two scanning lines is discarded and that buffer memory which memorizes the newest scanning line picture signal the writing in operation of which has always been terminated is connected to the reading out device 24. Thus, the picture signal before one scanning is not read out when the control instruction signal $C_2$ is supplied to the read out device 24.

As stated hereinbefore, the use of the buffer memory having a capacity for two scanning lines permits writing in and reading out operations to be simultaneously effected, so that it is possible to significantly alleviate the requirements for the operating speed of the facsimile scanner.

The above mentioned facsimile scanning conversion system which makes use of calculation is suitable for controlling programs by means of a computor unit such as a microprocessor, etc. But, the above mentioned facsimile scanning conversion system is somewhat complex in construction and hence is not suitable to use as a hardware system. In order to obviate such disadvantage, the invention may provide a modified facsimile scanning conversion system which makes use of conversion of number of pulses and which is simple in construction.

Such modified facsimile scanning conversion system according to the invention is based on such recognition that the system can be controlled such that total number of scanning lines of one picture surface is always the same. For this purpose, skip or interpolation of the scanning line is effected as uniformly as possible overall the picture surface to convert the total number of scanning lines into a given number of scanning lines.

Such scanning conversion will now be described with reference to the example shown in the Table I or Table III in which the conversion ratio $Mt/Mr = 0.6$.

In Table I showing the scanning conversion in which the transmitter side is the scanning converter, while a picture signal composed of 10 scanning lines is electrically transmitted from the buffer memory, a picture signal composed of 6 scanning lines is scanned and delivered into the buffer memory. That is, while an electrical transmission or reading out control instruction is delivered 10 times, a scanning or writing in control instruction is delivered 6 times, that means conversion of the number of pulses.

The principle of the conversion of number of pulses will now be described with reference to FIG. 5 which shows a further embodiment of the facsimile scanning conversion system according to the invention.

Figure 5:
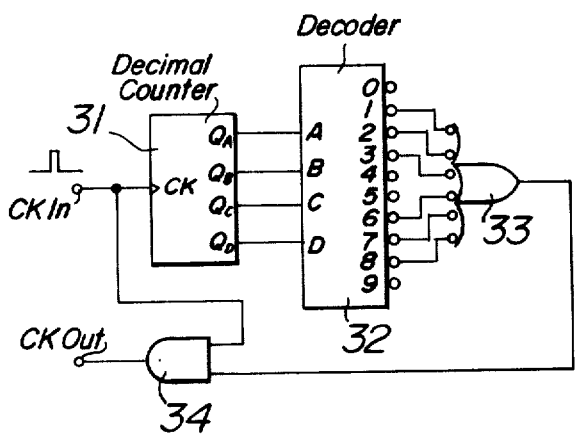
FIG. 5 is a block diagram illustrating another embodiment of the facsimile scanning conversion system according to the invention which makes use of a simple pulse number conversion.
Figure 4:
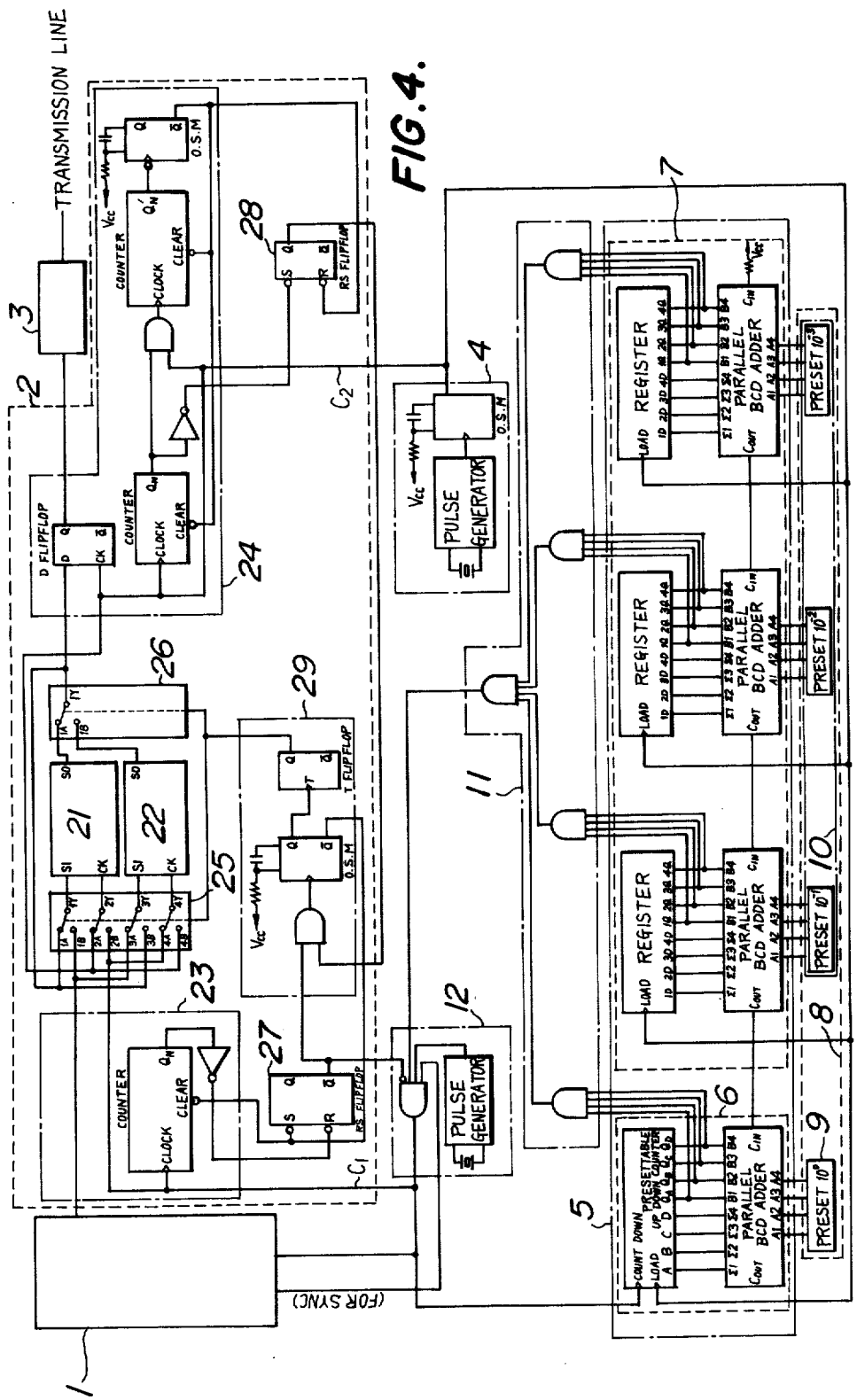
FIG. 4 is a block diagram illustrating another embodiment of the facsimile scanning conversion system according to the invention which is a combination of the systems shown in FIGS. 2 and 3.

In FIG. 5 CKin designates an input pulse delivered from the electrical transmission control device 4 shown in FIG. 2 and composed of an electrical transmission control instruction having a given period. The input pulse CKin is delivered to a decimal counter 31 which counts the input pulse CKin to provide binary coded decimal outputs $Q_A$-$Q_D$ which are then supplied to input terminals A-D of a decoder 32, respectively. Output pulses decoded by the decoder 32 are produced in succession at 10 output lines which correspond to count values 0-9. Among these 10 output lines, only 6 output lines 1, 2, 3, 6, 7, 8 are connected to an OR circuit 33, so that outputs from these 6 output lines 1, 2, 3, 6, 7, 8 are delivered to the OR circuit 33. That is, if the input pulse CKin is divided into a number of sets each composed of 10 input pulses 0-9, the outputs from the OR circuit 33 with respect to the 1st, 2nd, 3rd, 6th, 7th, 8th pulses become high in logic level. The output from the OR circuit 33 is supplied to an AND circuit 34. As a result, the input pulse CKin, that is, the output from the OR circuit 33 is gated by the AND circuit 34 to obtain 6 output pulses CKout with respect to the 10 input pulses CKin. These 6 output pulses CKout are used as the scanning control instruction from the scanning control device 12 shown in FIG. 2.

As can be seen from FIG. 5, any desired number of output pulses from 0 to 10 pulses can be selected by connecting corresponding number of output lines of the decoder 32 to the inputs of the OR circuit 33. In addition, the output pulses thus selected can be evenly distributed.

An integrated circuit (TTL MSI) having the above mentioned pulse number conversion faculty is available in market. As such integrated circuit, use may be made of a synchronous decade rate multiplier SN 74167 manufactured by, for example, the Texas Instrument Co. This integrated circuit may be made preset from the outside by means of BCD codes so as to obtain any number of output pulses 0 to 9 from 10 input pulses. In addition, a plurality of integrated circuits may be connected in cascade so as to obtain any number of output pulses 0 to 9 from 100 input pulses, 1000 input pulses . . . . . As a result, it is possible to obtain any pulse ratio by adding another OR circuit at the outside the integrated circuit.

If it is desired to obtain an output pulse number which is larger than the input pulse number, use may be made of input pulses each having a higher frequency.

Figure 6:
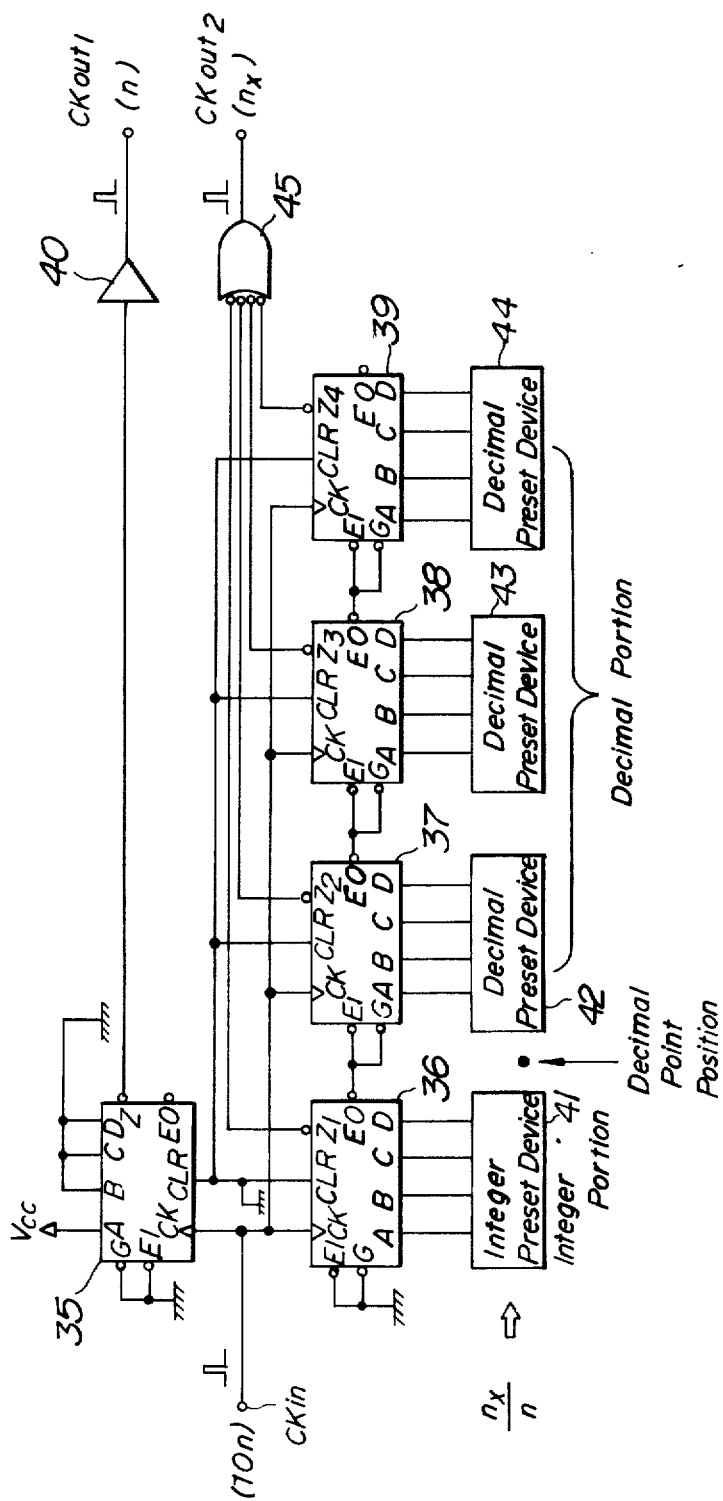
FIG. 6 is a block diagram illustrating a modified embodiment of the facsimile scanning conversion system according to the invention shown in FIG. 5.

In FIG. 6 is shown a still further embodiment of the facsimile scanning conversion system according to the invention which can convert the pulse number ratio into any ratio given by $n/nx$.

In the embodiment shown in FIG. 5, an effective number of four figures is preset. Reference numerals 35-39 designate pulse number conversion elements shown in FIG. 5.

The element 35 serves to divide a frequency which is 10 times higher than a pulse frequency required for the electrical transmission instruction to be delivered from the input terminal CKin into 10 frequency components. These 10 frequency components are supplied through an inverter 40 to an output terminal Ckout$_1$ from which is delivered a pulse $n$ having a given period and used as the electrical transmission control instruction.

The elements 36-39 are connected in cascade and preset by respective preset devices 41-44 such that 0 to 9 outputs can be obtained for 10 input pulses, 100 input pulses, 1000 input pulses and 10,000 input pulses, respectively. As a result, the preset devices 41-44 may be preset so as to obtain an output pulse with any ratio $(nx/n)$.

If it is desired to obtain $(nx/n)=1.234$, for example, the integer preset device 41 is set to 1 and the decimal preset devices 42, 43, 44 are set to 2, 3, 4, respectively. If the input pulse $n = 1000$ is supplied from the input terminal CKin to respective input terminals CK of the preset devices 41-44, 1000 outputs, 200 outputs, 30 outputs, 4 outputs are produced at respective output terminals $Z_1$-$Z_4$ of the preset devices 41-44. These outputs are delivered through an OR circuit 45 to an output terminal CKout$_2$ from which is obtained an output pulse $nx = 1.234$.

In FIG. 6, CK designates a clock input terminal, $E_1$ a driving input terminal, $E_0$ a driving output terminal, G a strobe input terminal, A, B, C, D preset input terminals and CLR a clear input terminal.

As can be seen from the above, the facsimile scanning conversion system according to the invention can simply be carried out with the aid of existing pulse conversion elements available in market.

What is claimed is:

1. A facsimile scanning conversion system which can convert a facsimile scanning at a transmitter side or a receiver side such that a picture surface received at the receiver is correctly similar to that to be transmitted from the transmitter when either one or both an index of cooperation and a scanning speed of a facsimile transmitter is or are different from that or those of a facsimile receiver, which makes use of a buffer memory having a capacity for memorizing at least one scanning line picture signal and an electrical transmission control device, which can read out one scanning line picture signal from said buffer memory or write in said one scanning line picture signal to said buffer memory with a given period which coincides with a scanning period of corresponding receiver or transmitter for effecting a continuous scanning operation with the aid of said electrical transmission control device, which makes use of an addition register, a scanning control device and a facsimile scanner, which can add a ratio between indexes of cooperation of said transmitter and said receiver to said addition register with said period, can effect when the value of an integer portion of said addition register is not 1 one line scanning operation of said facsimile scanner and can write in one scanning line picture signal to said buffer memory or read out one scanning line picture signal from said buffer memory and subtract 1 from the value of the integer portion of said addition register to repeatedly effect said scanning of said facsimile scanner and said writing in or reading out operation of said buffer memory until the value of the integer portion of said addition register reaches to zero with the aid of said scanning control device.

2. A facsimile scanning conversion system as claimed in claim 1, in which said electrical transmission control device can read out one scanning line picture signal from said buffer memory or write in said one scanning line picture signal to said buffer memory by means of an electrical transmission control instruction pulse delivered from said electrical transmission control device and having a given frequency which corresponds to a scanning period of corresponding receiver or transmitter for effecting a continuous scanning operation, and said scanning control device can pick up in a dispersion manner a scanning control instruction pulse from a pulse having a frequency which coincides with or integer times higher than said given frequency of said electrical transmission control instruction pulse with a rate given by a ratio of the index of cooperation of said transmitter to the index of cooperation of said receiver, each said scanning control instruction pulses thus picked up effecting each scanning operation of said facsimile scanner and writing in said one scanning line picture signal to said buffer memory or reading out said one scanning line picture signal from said buffer memory.

* * * * *